United States Patent [19]

Sutton et al.

[11] Patent Number: 4,565,578

[45] Date of Patent: Jan. 21, 1986

[54] GAS GENERATION RETARDED ALUMINUM POWDER FOR OIL FIELD CEMENTS

[75] Inventors: David L. Sutton; John F. Burkhalter, both of Duncan, Okla.

[73] Assignee: Halliburton Company, Duncan, Okla.

[21] Appl. No.: 705,599

[22] Filed: Feb. 26, 1985

[51] Int. Cl.[4] ............................................... C04B 7/02
[52] U.S. Cl. .................................. 106/87; 106/90; 106/314; 106/315; 106/290; 106/308 F; 166/293
[58] Field of Search ................... 106/90, 314, 315, 87, 106/290, 308 F; 427/216; 166/293

[56] References Cited

U.S. PATENT DOCUMENTS

| | | | |
|---|---|---|---|
| 3,197,323 | 7/1965 | Rehmar | 106/314 |
| 3,244,542 | 4/1966 | Brown et al. | 106/277 |
| 3,551,174 | 12/1970 | Hauska et al. | 106/314 |
| 3,579,366 | 5/1971 | Rehmar | 106/314 |
| 3,918,984 | 11/1975 | High et al. | 106/290 |
| 4,318,747 | 3/1982 | Ishijima et al. | 106/290 |
| 4,328,038 | 5/1982 | Briggs | 106/87 |
| 4,332,619 | 6/1982 | Gandy et al. | 106/87 |
| 4,340,427 | 7/1982 | Sutton | 106/87 |
| 4,367,093 | 1/1983 | Burkhalter et al. | 106/87 |
| 4,450,010 | 5/1984 | Burkhalter et al. | 106/87 |

FOREIGN PATENT DOCUMENTS

58-60650  4/1983  Japan .................. 106/315

OTHER PUBLICATIONS

Chemical Abstracts, 90:56,499v, (1979).

*Primary Examiner*—William R. Dixon, Jr.
*Assistant Examiner*—Steven Capella
*Attorney, Agent, or Firm*—Robert A. Kent; Thomas R. Weaver

[57] ABSTRACT

An essentially dry gas generation retarded aluminum powder for oil field cements is provided. The retarded aluminum powder is formed by dissolving an effective amount of an aluminum reaction rate retarder in an organic solvent, the retarder being selected from fatty acid esters of sorbitan, glycerol and pentaerythritol. Aluminum powder is mixed with the retarder-solvent solution whereby the aluminum powder is wetted with the solution followed by drying the aluminum powder by vacuum evaporating and removing the organic solvent therefrom. Methods of forming gas generation retarded oil field cements and using such cements are also provided.

20 Claims, No Drawings

4,565,578

1

GAS GENERATION RETARDED ALUMINUM POWDER FOR OIL FIELD CEMENTS

BACKGROUND OF THE INVENTION

1. Field of the Invention

The present invention relates to gas generation retarded aluminum powders for oil field cements, and more particularly, to methods of forming and using essentially dry retarded aluminum powder capable of being dry blended with cement.

2. Description of the Prior Art

In the completion of an oil, gas or water well, the annular space between casing disposed in the wellbore and the surrounding earth formations is cemented whereby the casing is bonded to the formations and the annulus is sealed to prevent formation fluid flow therethrough. Most often, a cement slurry is pumped down the inside of the casing and back up through the annular space outside the casing to the desired location therein. Once placed, the cement slurry is allowed to set into a hard mass.

In some wells, one or more of the zones adjacent the cemented annulus contain connate gas under substantial pressure which can enter the annular space after the cement slurry is placed therein, resulting in gas leakage. The gas can leak through the cemented annular space to the surface or to other subterranean zones as the cement slurry sets thereby forming a permanent flow channel or a highly permeable cement after final set. Such gas leakage is detrimental and often dangerous, and usually requires expensive remedial cementing operations to correct.

In order to prevent gas leakage problems, oil field cements which include gas generating agents have heretofore been developed and used. For example, U.S. Pat. No. 4,304,298 issued on Dec. 8, 1981 discloses a cement slurry containing a stabilized, dispersed gas therein whereby the slurry is compressible. The presence of the gas in the slurry and the compressibility thereof prevents gas under pressure from passing into and around the cement prior to the time the cement has set or gelled sufficiently to prevent upward gas percolation. The entrained gas, by virtue of its compressibility, reduces the magnitude of the pressure drop decrease resulting from slurry volume reduction. The preferred method of forming gas in the cement slurry is to include a metal, preferably aluminum powder, in the slurry which reacts with the aqueous alkaline solution therein to yield hydrogen gas in the slurry.

As indicated in the above-mentioned patent, it is often desirable to retard the reaction rate of aluminum powder mixed with oil field cements so that the generation of hydrogen gas therein is delayed. When unretarded aluminum powder is mixed with a cement slurry, the reaction of the aluminum with the aqueous solution in the slurry to produce hydrogen gas occurs rapidly, and in many instances, the hydrogen gas can be released too quickly. For example, if the hydrogen gas is released in the cement slurry prior to placing it in the annulus, a large part of the effectiveness of the slurry in preventing gas leakage can be lost. In addition, hydrogen gas is extremely explosive and its generation at inappropriate times, such as during surface mixing operations, can be dangerous.

Another problem which can occur in the use of aluminum powder for gas generation in cement slurries is the reaction rate retardation brought about by oxidization. The retarding effect of aluminum powder surface oxidization caused by exposure of the powder to the air can be so strong that no reaction takes place or the reaction that does take place is delayed too long and is not effective for controlling gas leakage.

In order to overcome these problems, a variety of coatings and chemical retarders have heretofore been developed and used in association with aluminum powder in oil field cements. For example, U.S. Pat. No. 4,367,093 issued Jan. 4, 1983, discloses a cement composition and method of cementing whereby the rate of release of hydrogen gas formed from aluminum powder is controlled by including a chemical inhibitor in the cement. While this and other similar methods of controlling or inhibiting the reaction of aluminum powder in cement have been used successfully, they have been expensive or require that the aluminum powder be premixed with one or more inhibitor chemicals in a carrier liquid followed by combining the liquid mixture with a cement slurry.

By the present invention, methods of forming and using an essentially dry hydrogen gas generation retarded aluminum powder which is protected from oxidization and which can be dry blended directly with cement are provided.

DESCRIPTION OF PREFERRED EMBODIMENTS

In accordance with the present invention, the reactivity of aluminum powder with the aqueous alkaline solutions of cement slurries is retarded by treating the aluminum powder with fatty acid esters of sorbitan, glycerol and/or pentaerythritol. That is, an effective quantity of one or more of such esters is first dissolved in an organic solvent which can subsequently be evaporated and removed under vacuum. The resulting retarder solution is then combined with a quantity of aluminum powder whereby the aluminum powder is wetted with the solution followed by the vacuum evaporation of the solvent and vacuum drying of the aluminum powder.

Particularly suitable fatty acid esters which have high surface activity and function to retard the reactivity of aluminum powder are those selected from the group consisting of sorbitan monooleate, sorbitan monoricinoleate, sorbitan monotallate, sorbitan monoisostearate, sorbitan monostearate, glycerol monoricinoleate, glycerol monostearate, pentaerythritol monoricinoleate, and mixtures of such retarders. Of these, sorbitan monooleate is most preferred.

A variety of organic solvents which can be subsequently removed by vacuum evaporation can be utilized in accordance with the present invention. For example, one or more organic solvents selected from the group consisting of methyl alcohol, ethyl alcohol, isopropyl alcohol, medium boiling petroleum distillates, petroleum ether and mixtures of such solvents can be utilized. Of these, petroleum ether is preferred.

The quantity of fatty acid ester retarder which is dissolved in the solvent and subsequently deposited on the aluminum powder is based on the weight of aluminum powder to be mixed with the retarder solution. Also, the quantity of retarder required for efficient retardation depends on the surface area of the aluminum powder and the extent of retardation desired in the final product. For example, an aluminum powder with an average surface area of about 2600 square centimeters/gram requires a solution containing in the range of from about 0.5% to about 3.0% retarder by weight of aluminum to be coated. An aluminum powder with an average surface area of about 6800 square centimeters/gram requires a solution containing in the range of from about 1.0% to about 15% retarder by weight of aluminum to be coated. Generally, in order to retard aluminum powder whereby gas generation is prevented during surface cement slurry mixing operations, a retarder solution containing retarder in the range of from about 0.5% to about 5.0% by weight of solvent is utilized. In order to retard the aluminum powder whereby appreciable gas generation is prevented in a cement slurry during mixing and pumping to a depth whereby the slurry reaches a temperature of about 200° F. under typical downhole oil and gas well cementing pressures, a retarder solution containing retarder in the range of from about 1.0% to about 5% by weight of aluminum powder to be coated is utilized. Overall, the broad range of retarder combined with the solvent is from about 0.05% to about 15% by weight of solution.

The quantity of retarder-organic solvent solution required to be combined with the aluminum powder to bring about the retardation thereof varies with the fineness and surface area of the powder, but generally is in the range of from about 40% to about 300% retarder solution by weight of aluminum powder. The minimum quantity of retarder solution is the quantity required to produce a fluid slurry when combined with the aluminum powder.

A typical formulation prior to solvent evaporation and removal for an aluminum powder having an average surface area of about 2600 square centimeters/gram and requiring a high degree of retardation is comprised, in parts by weight, of 3 parts fatty acid ester retarder, 60 parts organic solvent and 100 parts aluminum powder.

The general procedure for preparing the retarded aluminum powder product is to first prepare the retarder-organic solvent solution followed by mixing the aluminum powder into the solution. After the aluminum powder used has been thoroughly mixed with the retarder solution whereby it is thoroughly contacted and wetted with the solution and a fluid slurry produced, the organic solvent is removed from the slurry by vaccum evaporation. After most of the solvent is evaporated and removed, in order to obtain a uniform relatively dry product, the slurry is tumbled or otherwise agitated under vacuum. More particularly, the aluminum powder slurry is preferably confined in a container and agitated while being subjected to vacuum pumping and minimum heat, if any, for bringing about the evaporation of the solvent, the deposition of the retarder on the aluminum powder and the drying of powder. Particular attention is given to the final dryness of the powder whereby detectable traces of solvent do not remain on the powder and the powder is essentially free of solvent. If solvent is allowed to remain on the aluminum powder, the retardation thereof will not be as effective as it is otherwise. The vacuum drying of the treated aluminum powder results in a superior gas generation retarded aluminum powder for oil field cements as compared to drying the same treated powder in other ways such as by using conventional filtering and atmospheric oven drying techniques.

The resulting essentially dry retarded aluminum powder has good resistance to air oxidization and can be packaged and stored for long periods of time before use. When forming a gas generation retarded oil field cement using the retarded aluminum powder, the powder is preferably dry blended with the hydraulic cement utilized followed by mixing the cement-aluminum mixture with water to form a pumpable slurry.

The required delay in the generation of hydrogen gas in a cement slurry containing a retarded aluminum powder is dependent on the placement time of the slurry, i.e., the time required to pump the slurry to its downhole position. Placement time varies with well depth, hole size, casing size and placement rate, and is mostly in the range of from about 15 to about 150 minutes.

The particular reaction rate delay which results during a deep well cementing operation utilizing a cement slurry containing aluminum powder depends on four principal factors, namely, the properties of the aluminum powder, the downhole well conditions, the composition of the cement used and the additives used in the cement slurry. With respect to the aluminum powder, the specific properties involved are the surface area of the powder, the degree of oxidization of the surfaces of the powder particles and the particular type of and amount of reaction retarder utilized on the powder. As concerns the downhole well conditions, the reaction retardation is strongly influenced by temperature and pressure. It is known that increasing temperature speeds the reaction and increasing pressure slows the reaction. Application temperatures can vary from 60° F. to 460° F. and pressures can vary from 100 to 20,000 psi. As concerns the cement composition, the amount of available free lime and water soluble alkali influences the reaction retardation.

Generally, the gas generation retarded aluminum powder of this invention remains unreacted in a cement slurry for an initial time period of from about 15 to about 30 minutes, and then slowly increases in reactivity to a peak reaction rate in an additional time period in the range of from about 30 to about 90 minutes. Thus, after the mixing of the retarded aluminum powder in an oil field cement, the maximum quantity of gas generated in the cement can be caused to occur in the range of from about 45 minutes to about 150 minutes later.

The particular quantity of gas required to be generated in the cement slurry depends upon various factors, but can be defined as a quantity of at least 0.10 scf per cubic foot of slurry without gas or the amount of gas needed to effect an in-place compressibility increase of at least 25% over the in-place compressibility of the slurry without gas. The particular amount of retarded aluminum powder which must be combined with a cement slurry to produce the required entrained gas therein increases with increases in pressure since the compressibility resulting from a specific quantity of gas developed within the slurry decreases with increasing pressure. Generally, the amount of aluminum powder utilized in a cement slurry is in the range of from about 0.02% to about 2.0% by weight of dry cement used.

Portland cement is generally preferred because of its low cost and availability, but other cements such as pozzolanic cements, slag cements and high alumina content cements can be utilized with the retarded aluminum powder of this invention. Portland cements of API Classes H and G are the most preferred cements, although the other API classes of Portland cement can also be utilized. The characteristics of these cements are described in API Specification 10 issued by the American Petroleum Institute which is incorporated herein by reference.

A highly useful and effective cement slurry which includes the gas generation retarded aluminum powder of this invention utilizes the retarded aluminum powder mixed with API Class H cement in an amount in the range of from about 0.1% to about 1.0% by weight of dry cement and water in an amount sufficient to produce a pumpable slurry having a density of from about 10 to 20 pounds per gallon. The water used in the cement slurry can be water from any source provided it does not contain an excess of compounds which adversely react with the other components in the slurry. Other types of well known and conventional additives can be incorporated in the cement slurry to modify the properties of the final set cement and/or to alter the set times and curing rates of the slurry. Such additives include viscosifiers, dispersants, weight adjusting materials, friction reducers, fluid loss reducers, accelerators, filler materials, etc.

An example of a typical oil field cement utilizing the gas generation retarded aluminum powder of this invention is comprised of API Class H Portland cement, water in an amount of from about 35% to about 70% by weight of cement, fine silica sand with a particle size in the range of from about 124 micrometers to about 177 micrometers present in an amount in the range of from 0% to about 40% by weight of cement, a fluid loss control material present in an amount in the range of from about 0.3% to about 1.2% by weight of cement, accelerators and/or formation compability agents such as calcium chloride, sodium chloride or potassium chloride present in an amount in the range of from 0% to about 3% by weight of cement, cement thickening time retarder present in an amount in the range of from 0% to about 5% by weight of cement, density increasing agents or filler materials in an amount in the range of from 0% to about 100% by weight of cement, and retarded aluminum powder having an average particle diameter in the range of from about 5 micrometers to about 30 micrometers and a surface area in the range of from about 2000 to about 6800 square centimeters/gram in an amount in the range of from about 0.1% to about 1.0% by weight of cement. This composition, with selective variations in the quantities of additives and retarded aluminum powder is very effective for primary cementing in wells ranging from depths of about 100 feet to about 20,000 feet. The amount of retarded aluminum powder employed in the cement will be varied in correspondence to the depth of the well in which the slurry is to be used and the magnitude of the gas leakage potential therein.

In order to facilitate a clear understanding of the methods of the present invention, the following examples are given.

EXAMPLE 1

Gas generation reaction rate tests are carried out using various retarded and unretarded aluminum powders including the retarded aluminum powder of the present invention in various cement slurries. The tests are conducted in a stirring autoclave having a volume of approximately 1 liter. The autoclave is equipped with a paddle designed to assure positive agitation of the test cement slurries at shear rates similar to those encountered downhole during the placement of a slurry in a well. The autoclave is equipped with a heater and controls for regulating the heating rate and temperature of the test slurries tested, a system for pressurizing the autoclave whereby a selected pressure is maintained therein and the compressibility of the test slurries is monitored, and baffles to maintain separation between the test slurries and pressurizing fluid used.

The rate of gas generation by the reaction of aluminum powder in each of the cement slurries tested is determined by:
1. measuring the initial compressibility of the slurry at the test pressure, but before applying any heat to obtain the unreacted compressibility;
2. periodically remeasuring the compressibility, typically every 15 minutes;
3. calculating the compressibility of the test slurry by subtracting corrections for the compressibility of the pressurizing fluid, the test chamber and the pressurizing devices from the measured compressibility;
4. calculating the volume of gas in the test slurry from the measured slurry compressibility, the unreacted slurry compressibility and the compressibility of hydrogen at the test temperature and pressure using standard P-V tables for hydrogen;
5. calculating the lb.-moles of hydrogen gas generated per cubic foot of unreacted slurry from the volume of gas at test conditions, the test pressure and temperature, standard P-V tables for hydrogen, and the standard lb.-mole volume for gas;
6. equating the lb.-moles of hydrogen to lbs. of aluminum reacted and dividing by the amount of aluminum mixed into one cubic foot of unreacted slurry to obtain the fraction of aluminum reacted.

The compressibility, in units of micro volume change per unit volume per psi. (uv/v per psi.), is measured by withdrawing the pressurizing fluid from the chamber (from a position above the test slurry) until the test pressure is reduced by 10%, i.e., 8000 psi. to 7200 psi. The fluid is withdrawn with a single stroke plunger pump actuated via a lead screw and equipped with an index to measure the volume withdrawn. Such devices are known to the art of reservoir engineering as P-V or pressure volume pumps. The principal manufacturers of such devices are Ruska Instrument Co. of Houston, Tex. and TEMCO of Tulsa, Okla. A typical volume withdrawn on initial measurement is 2.5 cc. A typical volume withdrawn during a test period after the reaction is started is 3.2 cc. Typical correction volumes are 1.2 cc. for the initial measurement and 1.1 cc. for measurement at test temperature. The calculation for compressibility with these values is as follows:

Net Change = Total Withdrawn − Correction

Compressibility = Net Change/Test Volume/Pressure Change

For values given for initial measurement:

Net Change = 2.5 − 1.2 = 1.3
Compressibility = 1.3/1000/(8000−7200)
= 1.625 uv/v per psi.

For values given during reaction:

Net Change = 3.2 − 1.1 = 2.2
Compressibility = 2.2/1000/(8000−7200)
= 2.75 uv/v per psi.

The volume of gas at test pressure is calculated from the equation:

$$RSC = (GVF \times GC) + (USVF \times USC)$$

where
RSC=Reacted Slurry Compressibility
GVF=Gas Volume Fraction
GC=Gas Compressibility
USVF=Untreated Slurry Fraction
USC=Unreacted Slurry Compressibility.

Typical incremental gas compressibility (hydrogen) at 230° F. and 7200 to 8000 psi. is approximately 100 uv/v per psi. using $GVF+USVF=1.0$. The calculation from the previously given values is as follows:

$$2.75 = (GVF \times 100) + (1 - GVF) \times 1.625$$

$$2.75 = 100 GVF + 1.625 - 1.625 GVF$$

and $$GVF = 0.01144 \text{ Volume/Unit Volume Total.}$$

$$GFC/\text{Unit Volume Unreacted Slurry} = .01144/(1 - .01144)$$
$$= .01157.$$

Gas volume at standard condition is calculated from:

$$V_2 = V_1 \times (P_1/P_2) \times (PV_2/PV_1)$$

For example given:

$$V_2 = 0.01157(7614.7/14.7) \times (1.056/1.827)$$

$V_2 = 3.46$ Standard Cu.Ft. Gas per Cu. Ft. unfoamed slurry. lb.-moles=SCF/379 for 60° F. and one atmosphere, lb.-moles=3.46/379=0.00914.

Assuming one mole of aluminum yields one mole of hydrogen at high pressure in a cement slurry,* the amount of aluminum reacted is:

$$0.00914 \times 26.98 = 0.25 \text{ lbs. per cu. ft. of unreacted slurry.}$$

* This assumption is based on an aluminum valence of +2; however, the theoretical hydrogen yield at low pressure is 1.5 moles of hydrogen per moles of aluminum (an aluminum valence of +3).

Assuming for illustration that each cubic foot of slurry contains 0.50 lbs. aluminum, the percent reacted is then:

$$\% \text{ Reacted} = (0.25/0.50) \times 100$$
$$= 50\%$$

During each test, a pressure of 8000 psig. is maintained in the autoclave and the cement slurry tested is heated to an initial temperature of 80° F. The temperature is increased at a rate of 3.1° F./minute until a temperature of 230° F. is reached which is thereafter maintained at a constant level.

Various kinds and sizes of aluminum powders are utilized in the tests, the identification and properties of which are set forth in Table I below.

TABLE I

| Powder Designation | Manufacturer and Type | Average Particle Diameter (um) | Average Surface Area (cm$^2$/gm) |
|---|---|---|---|
| A | Reynolds 3-681 | 20[1] | 6800 |
| B | Reynolds 400 | 5 | 3500 |
| C | Reynolds 1-131 | 7 | 2600 |
| D | Reynolds 40 | 28 | 500 |

[1] flat thin flakes

In this example, aluminum powder A described in Table I above is tested in its original untreated form. In addition, a portion of powder A treated in accordance with the method of the present invention to form essentially dry retarded aluminum powder thereof is tested. That is, 100 parts by weight of aluminum powder A is mixed into a solution of 15 parts by weight sorbitan monooleate dissolved in 100 parts by weight isopropyl alcohol. After 5 minutes mixing at low speed, the resulting dispersion is evaporated to dryness in a rotary vacuum evaporator whereby all traces of solvent are removed from the powder. The gas generation reaction rate of the resulting essentially dry retarded aluminum powder in a cement slurry is determined in accordance with the above-described procedure.

An additional portion of aluminum powder A is treated by combining 100 parts by weight of the powder with 400 parts by weight silica flour and slowly adding 30 parts by weight of a 50% by weight solution of sorbitan monooleate in isopropyl alcohol thereto while mixing in a high speed blender. The resulting dry blended mixture is also tested in a cement slurry in accordance with the above-described procedure.

The base cement slurry utilized in the tests is comprised of 100 parts by weight Lone Star API Class H Portland cement shipped from New Orleans plant during November, 1983, 35 parts by weight 80-mesh silica sand, 0.6 parts by weight of a fluid loss additive (carboxymethylhydroxyethylcellulose type), 0.3 parts by weight of a dispersant (napthalene-formaldehyde type), 46 parts by weight water, 0.2 parts by weight thickening time retarder (lignosulfonate plus organic acid salt type) and 1.0 part by weight of a treated or untreated aluminum powder described above.

The thickening times of the cement slurries tested are determined in accordance with the procedure set forth in API Specification 10 referred to above.

The results of these tests are shown in Table II below.

TABLE II

| | Gas Generation Reaction Rate in the Cement Slurry Tested | | | | | | |
|---|---|---|---|---|---|---|---|
| Aluminum Powder Used | Initial Reaction Temperature, °F. | Reaction Time to 15% of Completion, Minutes | Reaction Time to 50% of Completion, Minutes | Reaction Time to 80% of Completion, Minutes | Maximum Reaction Rate | | Thickening Time, Minutes |
| | | | | | Time, Minutes | % Completed | |
| Untreated Powder "A" | 95 | 7 | 16 | note[1] | 16 | 30 | 16 |
| Dry Blend of Powder "A" with Silica Flour and | 25 | — | — | note[2] | — | — | 30 |

TABLE II-continued

| | Gas Generation Reaction Rate in the Cement Slurry Tested | | | | | | |
|---|---|---|---|---|---|---|---|
| Aluminum | Initial Reaction Temperature, °F. | Reaction Time to 15% of Completion, Minutes | Reaction Time to 50% of Completion, Minutes | Reaction Time to 80% of Completion, Minutes | Maximum Reaction Rate | | Thickening Time, Minutes |
| Powder Used | | | | | Time, Minutes | % Completed | |
| Sorbitan Monooleate-Isopropanol Solution Powder "A" Mixed into Sorbitan Monooleate-Isopropanol Solution and Vacuum Evaporated and Dried | 160 | 43 | 80 | note[3] | 169 | 71 | 169 |

[1]Note - very fast reactions in progress when test was terminated because of rapid gellation
[2]Note - test was terminated because of rapid gellation; fast reaction was in progress, but accurate percent reaction measurement was not possible
[3]Note - slow rate reaction in progress; test was terminated upon slurry reaching 70 Bc consistency From Table II it can be seen that aluminum powder treated in accordance with the method of the present invention whereby sorbitan-monooleate retarder is deposited on the powder by vacuum evaporation and drying provides superior retardation as compared to the same retarder applied to the aluminum powder mechanically.

EXAMPLE 2

The test procedure of Example 1 is repeated using the aluminum powder designated B in Table I and the same base cement slurry with the exception that the concentration of the thickening time retarder in the slurry is reduced to 0.1 parts by weight. The shipping date of the cement used is March, 1984.

In the first test the cement slurry includes untreated aluminum powder B. In the second test, aluminum powder B retarded in accordance with the method of the present invention is used in the cement slurry. That is, 100 parts by weight aluminum powder B is mixed into a solution of 5 parts by weight sorbitan monooleate and 50 parts by weight isopropyl alcohol. After mixing for 5 minutes at low speed, the dispersion is evaporated to dryness in a rotary vacuum evaporator followed by further vacuum drying to remove all traces of solvent. The resulting retarded powder is combined with the cement slurry in an amount of 1.0 parts by weight. In the third test, 1.38 parts of potassium chloride is added to the base slurry and aluminum powder B is retarded in the same manner as for the second test.

The results of these tests are given in Table III below.

TABLE III

| | Gas Generation Reaction Rate in the Cement Slurry Tested | | | | | | |
|---|---|---|---|---|---|---|---|
| Aluminum | Initial Reaction Temperature, °F. | Reaction Time to 15% of Completion, Minutes | Reaction Time to 50% of Completion, Minutes | Reaction Time to 80% of Completion, Minutes | Maximum Reaction Rate | | Thickening Time, Minutes |
| Powder Used | | | | | Time, Minutes | % Completed | |
| Untreated Powder "B" | 95 | 13 | 15 | 22 | 90 | 119 | 90 |
| Powder "B" Mixed into Sorbitan Monooleate-Isopropanol Solution and Vacuum Evaporated and Dried | 230 | 220 | NA | NA | 300 | 28 | 300 |
| Powder "B" Mixed into potassium chloride added to the cement slurry | 230 | 95 | 210 | NA | 300 | 52 | 300+* |

*Test terminated due to excessive thickening time; slow reaction still in progress.

EXAMPLE 3

The test procedure described in Example 1 is repeated using the base cement slurry described therein. The aluminum powder utilized in the tests is the powder designated C in Table I. In a first test, the aluminum powder used is untreated. In the second test, aluminum powder C is treated by combining 100 parts by weight of the powder with 100 parts by weight silica flour and then slowly adding 8 parts by weight of a 50% by weight sorbitan monooleate-isopropanol alcohol solution. The solution is added to the mixture of aluminum powder and silica flour while mixing in a high speed blender.

In the third test, aluminum powder C is treated by mixing 100 parts by weight aluminum powder into a solution comprised of 160 parts by weight isopropyl alcohol, 36 parts by weight glycol and 4 parts by weight water. After mixing for 1 minute, the dispersion is allowed to settle, the clear liquid is decanted and the remaining powder vacuum filtered and oven dried at 230° F. to constant weight.

In the fourth test, 100 parts by weight of aluminum powder C is mixed into a solution comprised of 3 parts by weight sorbitan monooleate in 60 parts by weight isopropyl alcohol. After mixing for 5 minutes at slow speed, the dispersion is vacuum evaporated in a rotary evaporator followed by additional vacuum drying to remove all traces of isopropyl alcohol.

The results of these tests are given in Table IV below.

In a first test, the aluminum powder used is untreated aluminum powder C. In a second test, the aluminum powder used is powder C which is treated by mixing 100 parts by weight into a solution of 3 parts by weight sorbitan monooleate dissolved in 60 parts by weight isopropyl alcohol. The powder is added to the solution and mixed at slow speed for 5 minutes. The resulting dispersion is vacuum filtered and the aluminum powder is vacuum dried.

In a third test, the aluminum powder used is powder C which is treated by mixing 100 parts by weight of powder C into a solution of 3 parts by weight sorbitan monooleate in 40 parts petroleum ether. After 5 minutes mixing at slow speed, the resulting dispersion is vacuum filtered and the aluminum powder is vacuum dried.

In a fourth test, the aluminum powder used is powder C treated by mixing 100 parts by weight into a solution of 3 parts by weight sorbitan monooleate dissolved in 40 parts by weight petroleum ether. After 5 minutes mixing at slow speed, the resulting dispersion is vacuum evaporated in a rotary evaporator and vacuum dried to remove all traces of solvent.

TABLE IV

| | Gas Generation Reaction Rate in the Cement Slurry Tested | | | | | | |
|---|---|---|---|---|---|---|---|
| Aluminum Powder Used | Initial Reaction Temperature, °F. | Reaction Time to 15% of Completion, Minutes | Reaction Time to 50% of Completion, Minutes | Reaction Time to 80% of Completion Minutes | Maximum Reaction Rate | | Thickening Time, Minutes |
| | | | | | Time, Minutes | % Completed | |
| Untreated Powder "C" | 230 | 55 | 70 | — | 150 | 65 | 465 |
| Dry Blend of Powder "C" with Silica Flour and Sorbitan Monooleate-Isopropanol Solution | 175 | 45 | 75 | 330 | 345 | 99 | 420 |
| Powder "C" Mixed into Sorbitan Monooleate-Isopropanol Solution and Separated by Filtration. Separated Powder then Oven Dried | 230 | 45 | — | — | 180 | 45 | >180[1] |
| Powder "C" Mixed into Sorbitan Monooleate-Isopropanol Solution and Vacuum Evaporated and Dried | 230 | 50 | 210 | 420 | 450 | 89 | 450 |

[1]Test stopped at 180 minutes due to poor reaction.

EXAMPLE 4

The procedure described in Example 1 is repeated using a base cement slurry which is the same as that described in Example 1 except that the cement is Centex API Class H cement, the thickening time retarder is included in the slurry at a concentration of 0.1% by weight of dry cement used and potassium chloride is added to the slurry at a concentration of 1.38% by weight of dry cement used.

In a fifth test, aluminum powder C is used which is treated by mixing 100 parts by weight into a solution of 3 parts by weight sorbitan monooleate in 60 parts by weight isopropyl alcohol. After mixing for 5 minutes at slow speed, the resulting dispersion is vacuum evaporated in a rotary evaporator and then vacuum dried to remove all traces of solvent.

The results of these tests are given in Table V below.

TABLE V

| | Gas Generation Reaction Rate in the Cement Slurry Tested | | | | | | |
|---|---|---|---|---|---|---|---|
| Aluminum Powder Used | Initial Reaction Temperature, °F. | Reaction Time to 15% of Completion, Minutes | Reaction Time to 50% of Completion, Minutes | Reaction Time to 80% of Completion, Minutes | Maximum Reaction Rate | | Thickening Time, Minutes |
| | | | | | Time, Minutes | % Completed | |
| Untreated Powder "C" | 113 | 17 | 20 | 25 | 175 | 121 | 100 |
| Powder "C" Mixed into Sorbitan Monooleate-Isopropanol Solution and Separated by Filtration. Separated Powder Vacuum Dried | 97 | 17 | 20 | 28 | 90 | 125 | 90 |
| Powder "C" Mixed into Sorbitan Monooleate-Petroleum Ether Solution and Separated by Filtration. Separated Powder Vacuum Dried | 113 | 17 | 20 | 28 | 60 | 120 | 105 |
| Powder "C" Mixed into Sorbitan Monooleate-Petroleum Ether Solution and Vacuum Evaporated and Dried | 230 | 55 | 165 | — | 300 | 83 | 315 |
| Powder "C" Mixed into Sorbitan Monooleate-Isopropanol Solution and Vacuum Evaporated and Dried | 230 | 65 | 210 | — | 285 | 57 | 285 |

From Table V it can be seen that aluminum powder treated in accordance with the method of the present invention results in the best cement slurry retardation of the aluminum reaction in the cement slurry.

EXAMPLE 5

The procedure described in Example 1 is repeated using a base cement slurry which is the same as that described in Example 1 except that that thickening time retarder is included in the slurry at a concentration of 0.1% by weight of dry cement used and potassium chloride is added to the slurry at a concentration of 1.38% by weight of dry cement.

In a first test, the aluminum powder used is treated by mixing 100 parts by weight powder C into a solution of 3 parts by weight sorbitan monooleate in 50 parts by weight diesel oil. After 5 minutes of slow speed mixing, the dispersion is vacuum filtered. The aluminum powder is then vacuum dried to a constant weight.

In a second test, the aluminum powder used is powder C which is treated by mixing 100 parts by weight into a solution of 3 parts by weight sorbitan monooleate in 50 parts by weight naphtha. After 5 minutes of slow speed mixing, the resulting dispersion is vacuum filtered and the aluminum powder is vacuum dried to constant weight.

In a third test, aluminum powder C is used which is treated by mixing 100 parts by weight into a solution of 3 parts by weight sorbitan monooleate dissolved in 60 parts by weight isopropyl alcohol. After mixing for 5 minutes at slow speed, the resulting dispersion is vacuum evaporated in a rotary evaporator and then vacuum dried to remove all traces of solvent. The results of these tests are given in Table VI below.

TABLE VI

| | Gas Generation Reaction Rate in the Cement Slurry Tested | | | | | | |
|---|---|---|---|---|---|---|---|
| Aluminum Powder Used | Initial Reaction Temperature, °F. | Reaction Time to 15% of Completion, Minutes | Reaction Time to 50% of Completion, Minutes | Reaction Time to 80% of Completion, Minutes | Maximum Reaction Rate | | Thickening Time, Minutes |
| | | | | | Time, Minutes | % Completed | |
| Powder "C" Mixed into Sorbitan Monooleate-Diesel Oil Solution and | 120 | 17 | 25 | 50 | 60 | 123 | 128 |

TABLE VI-continued

| | | Gas Generation Reaction Rate in the Cement Slurry Tested | | | | | |
|---|---|---|---|---|---|---|---|
| Aluminum Powder Used | Initial Reaction Temperature, °F. | Reaction Time to 15% of Completion, Minutes | Reaction Time to 50% of Completion, Minutes | Reaction Time to 80% of Completion, Minutes | Maximum Reaction Rate | | Thickening Time, Minutes |
| | | | | | Time, Minutes | % Completed | |
| Separated by Filtration. Separated Powder Vacuum Dried | | | | | | | |
| Powder "C" Mixed into Sorbitan Monooleate-Naphtha Solution and Separated by Filtration. Separated Powder Vacuum Dried | 150 | 32 | 40 | 50 | 105 | 111 | 105 |
| Powder "C" Mixed into Sorbitan Monooleate-Isopropanol Solution and Vacuum Evaporated and Dried | 180 | 40 | 58 | 310 | 360 | 90 | 360 |

EXAMPLE 6

Untreated aluminum powders of varying coarseness are tested in accordance with the procedure described in Example 1 using the base cement slurry described therein. The results of these tests are given in Table VII below.

TABLE VII

| Aluminum Powder Used | Surface Area Square Centimeter per Gram | Gas Generation Reaction Rate in the Cement Slurry Tested | | | | | |
|---|---|---|---|---|---|---|---|
| | | Initial Reaction Temperature, °F. | Reaction Time to 15% of Completion, Minutes | Reaction Time to 50% of Completion, Minutes | Reaction Time to 80% of Completion, Minutes | Maximum Reaction Rate | Thickening Time, Minutes |
| | | | | | | Time, Minutes / % Completed | |
| D | 500 | 230 | 195 | — | — | 270 / 47 | 270 |
| C | 2600 | 230 | 55 | 90 | — | 180 / 61 | >180 |
| B | 6800 | 87 | 7 | 14 | 20 | 96 / 99 | 96 |

EXAMPLE 7

The procedure described in Example 1 is repeated. In a first test, the base cement slurry is the same as that described in Example 1 except that the cement is API Class H Lone Star cement shipped from Corpus Christi, Tex. during November, 1983, having a free lime content of 0.12% by weight and a water soluble alkali content of 0.019%, the thickening time retarder is included in the slurry at a concentration of 0.1% by weight of dry cement used, and potassium chloride is added to the slurry at a concentration of 1.38% by weight of dry cement used. The aluminum powder used is aluminum powder C treated by mixing 100 parts by weight into a solution of 3 parts by weight sorbitan monooleate and 60 parts by weight isopropyl alcohol. After mixing for 5 minutes at slow speed, the resulting dispersion is vacuum evaporated in a rotary evaporator and then vacuum dried to remove all traces of solvent.

In a second test, the base cement slurry is the same as that used in the first test except that the cement is API Class H Trinity cement from Duncan, Okla. shipped November, 1983, having a free lime content of 0.68% by weight and a water soluble alkali content of 0.23% by weight. The aluminum powder used is the same as that used in the first test.

In a third test, the same base cement slurry is used as that used in the first test except that the cement is API Class H Centex cement from El Campo, Tex. shipped November, 1983, having a free lime content of 0.06% by weight and a water soluble alkali content of 0.095% by weight. The aluminum powder used is the same as that used in the first test.

The results of these tests are given in Table VIII below.

TABLE VIII

Gas Generation Reaction Rate in the Cement Slurry Tested

| Aluminum Powder Used | Cement Used | Initial Reaction Temperature, °F. | Reaction Time to 15% of Completion, Minutes | Reaction Time to 50% of Completion, Minutes | Reaction Time to 80% of Completion, Minutes | Maximum Reaction Rate Time, Minutes | Maximum Reaction Rate % Completed | Thickening Time, Minutes |
|---|---|---|---|---|---|---|---|---|
| Powder "C" Mixed into Sorbitan Mono-Oleate-Isopropanol Solution and Vacuum Evaporated and Dried | Cement having Free Lime (FL) Content of 0.12% by weight and Water Soluble Alkali (WSA) Content of 0.019% by weight | 230 | 160 | — | — | 330 | 42 | 330 |
| Same | Same except FL = 0.68% WSA = 0.23% | 163 | 38 | 42 | 90 | 90 | 106 | 105 |
| Same | Same except FL = 0.06% WSA = 0.095% | 160 | 40 | 60 | 250 | 270 | 109 | 272 |

From Table VI it can be seen that aluminum powder processed by mixing the powder into a solution of sorbitan monooleate in diesel oil (first test) or solvent naphtha (second test) followed by filtration to remove the excess solvent and then vacuum drying results in reaction delays which are much less than the delays produced in the same powder treated in accordance with the method of this invention (third test). Also, the filtered and dried powder results in severe reductions in thicking times as compared to the aluminum powder treated in accordance with the present invention.

Table VII shows the influence of the aluminum powder surface area on the starting time of the reaction and on the reaction rate. The time for 15% reaction is reduced from 195 minutes for the coarsest powder (surface area of 500) to only 7 minutes for the finest powder (surface area of 6800).

Table VIII illustrates the change in the starting times of reactions and reaction rates that can be caused by minor changes in the cement composition, i.e., the small changes in the three cements used are within the specifications for API Class H cement, but such changes (water soluble alkali cnad free lime composition) result in a variation of the 15% reaction time from 40 minutes to 160 minutes.

What is claimed is:

1. A method of forming an essentially dry hydrogen gas generation retarded aluminum powder for oil field cements comprising the steps of:
    dissolving an effective amount of an aluminum reaction rate retarder in an organic solvent, said retarder being selected from the group consisting of sorbitan monooleate, glycerol monoricinoleate, sorbitan monoricinoleate, sorbitan monotallate, pentaerythritol monoricinoleate, sorbitan monoisostearate, glycerol monostearate, sorbitan monostearate and mixtures thereof;
    mixing aluminum powder with the resulting solution whereby said aluminum powder is wetted with said solution; and
    drying said aluminum powder by vacuum evaporating and removing said organic solvent therefrom.

2. The method of claim 1 wherein said organic solvent is selected from the group consisting of methyl alcohol, ethyl alcohol, isopropanol and petroleum ether.

3. The method of claim 1 wherein said retarder is sorbitan monooleate.

4. The method of claim 1 wherein said retarder is dissolved in said organic solvent in an amount in the range of from about 0.05% to about 15% by weight of said aluminum powder to be coated.

5. The method of claim 4 wherein said retarder-solvent solution is mixed with said aluminum powder in an amount in the range of from about 40% to about 300% retarder-solvent solution by weight of aluminum powder.

6. The method of claim 4 wherein said aluminum powder has an average particle diameter in the range of from about 5 micrometers to about 30 micrometers and a surface area in the range of from about 2000 to about 6800 square centimeters/gram.

7. In a method of cementing in an annulus between a well casing and a wellbore using a cement slurry containing powdered aluminum for generating hydrogen gas in the cement slurry, the improvement comprising utilizing an essentially dry hydrogen gas generation retarded aluminum powder in said cement slurry formed by dissolving an effective amount of an aluminum reaction rate retarder in an organic solvent, said retarder being selected from the group consisting of sorbitan monooleate, glycerol monoricinoleate, sorbitan monoricinoleate, sorbitan monotallate, pentaerythritol monoricinoleate, sorbitan monoisostearate, glycerol monostearate, sorbitan monostearate and mixtures thereof, mixing aluminum powder with the resulting solution whereby said aluminum powder is wetted with said solution, and drying said aluminum powder by vacuum evaporating and removing said organic solvent therefrom.

8. The method of claim 7 wherein said organic solvent is selected from the group consisting of methyl alcohol, ethyl alcohol, isopropanol and petroleum ether.

9. The method of claim 7 wherein said retarder is sorbitan monooleate.

10. The method of claim 7 wherein said retarder is dissolved in said organic solvent in an amount in the range of from about 0.05% to about 15% by weight of said aluminum powder to be coated.

11. The method of claim 10 wherein said retarder-solvent solution is mixed with said aluminum powder in an amount in the range of from about 40% to about 300% retarder-solvent solution by weight of aluminum powder.

12. The method of claim 10 wherein said aluminum powder has an average particle diameter in the range of from about 5 micrometers to about 30 micrometers and a surface area in the range of from about 2000 to about 6800 square centimeters/gram.

13. A method of forming a gas generation retarded oil field cement comprising the steps of:
  dry blending a hydraulic cement with an essentially dry gas generation retarded aluminum powder to form a mixture thereof, said gas generation retarded aluminum powder being formed by:
  dissolving an effective amount of an aluminum reaction rate retarder in an organic solvent, said retarder being selected from the group consisting of sorbitan monooleate, glycerol monoricinoleate, sorbitan monoricinoleate, sorbitan monotallate, pentaerythritol monoricinoleate, sorbitan monoisostearate, glycerol monostearate, sorbitan monostearate and mixtures thereof;
  mixing aluminum powder with the resulting solution whereby said aluminum powder is wetted with said solution; and then
  drying said aluminum powder by vacuum evaporating and removing said organic solvent therefrom; and
  mixing said cement retarded aluminum powder mixture with a sufficient amount of water to form a pumpable cement slurry.

14. The method of claim 13 wherein said organic solvent is selected from the group consisting of methyl alcohol, ethyl alcohol, isopropanol and petroleum ether.

15. The method of claim 13 wherein said retarder is sorbitan monooleate.

16. The method of claim 13 wherein said retarder is dissolved in said organic solvent in an amount in the range of from about 0.05% to about 15% by weight of said aluminum powder to be coated.

17. The method of claim 16 wherein said retarder-solvent solution is mixed with said aluminum powder in an amount in the range of from about 40% to about 300% retarder-solvent solution by weight of aluminum powder.

18. The method of claim 10 wherein said aluminum powder has an average particle diameter in the range of from about 5 micrometers to about 30 micrometers and a surface area in the range of from about 2000 to about 6800 square centimeters/gram.

19. The method of claim 18 wherein said retarded aluminum powder is blended with said hydraulic cement in an amount in the range of from about 0.02% to about 2% by weight of cement 20. The method of claim 19 wherein said hydraulic cement is selected from the group consisting of Portland cements of API Classes H and G.

* * * * *